(12) United States Patent
Longo-Schedel et al.

(10) Patent No.: US 12,319,802 B2
(45) Date of Patent: Jun. 3, 2025

(54) HIGH CRYSTALLINITY POLYAMIDE FOAM PARTICLES AND FOAM MOLDINGS

(71) Applicant: BASF SE, Ludwigshafen am Rhein (DE)

(72) Inventors: Daniela Longo-Schedel, Ludwigshafen (DE); Isa Alexandra Queiroz Da Fonseca, Ludwigshafen (DE); Patrick Spies, Ludwigshafen (DE); Rene Holschuh, Ludwigshafen (DE); Rainer Birli, Ludwigshafen (DE); Angelika Keller, Ludwigshafen (DE)

(73) Assignee: BASF SE, Ludwigshafen am Rhein (DE)

( * ) Notice: Subject to any disclaimer, the term of this patent is extended or adjusted under 35 U.S.C. 154(b) by 718 days.

(21) Appl. No.: 17/753,712

(22) PCT Filed: Sep. 11, 2020

(86) PCT No.: PCT/EP2020/075443
§ 371 (c)(1),
(2) Date: Mar. 11, 2022

(87) PCT Pub. No.: WO2021/052881
PCT Pub. Date: Mar. 25, 2021

(65) Prior Publication Data
US 2022/0340727 A1 Oct. 27, 2022

(30) Foreign Application Priority Data
Sep. 17, 2019 (EP) .................................. 19197734

(51) Int. Cl.
*C08J 9/16* (2006.01)
*C08J 9/00* (2006.01)
*C08J 9/12* (2006.01)
*C08J 9/18* (2006.01)
*C08J 9/228* (2006.01)
*C08L 77/02* (2006.01)
*C08L 77/08* (2006.01)

(52) U.S. Cl.
CPC .............. *C08J 9/0061* (2013.01); *C08J 9/122* (2013.01); *C08J 9/228* (2013.01); *C08L 77/02* (2013.01); *C08L 77/08* (2013.01); *C08J 2201/03* (2013.01); *C08J 2203/06* (2013.01); *C08J 2377/02* (2013.01); *C08J 2377/08* (2013.01); *C08J 2477/02* (2013.01); *C08J 2477/08* (2013.01); *C08L 2205/02* (2013.01)

(58) Field of Classification Search
CPC . C08J 9/0061; C08J 9/122; C08J 9/228; C08J 2201/03; C08J 2203/06; C08J 2377/02; C08J 2377/08; C08J 2477/02; C08J 2477/08; C08J 9/18; C08J 9/232; C08J 9/16; C08J 9/0066; C08L 77/02; C08L 77/08; C08L 2205/02; C08L 77/06; B29B 9/065; B29B 9/12; C08K 3/34
See application file for complete search history.

(56) References Cited

U.S. PATENT DOCUMENTS

| 4,212,777 A | 7/1980 | Goletto |
| 5,013,518 A * | 5/1991 | Nielinger ............... C08G 69/34 264/331.19 |
| 10,279,516 B2 | 5/2019 | Daschlein et al. |
| 2011/0294910 A1 | 12/2011 | Kriha et al. |
| 2021/0269614 A1 | 9/2021 | Ahlers et al. |

FOREIGN PATENT DOCUMENTS

| CN | 1302826 A * | 7/2001 |
| EP | 3272798 A1 | 1/2018 |
| JP | H03197563 A * | 8/1991 |
| WO | 2011134996 A1 | 11/2011 |
| WO | 2014198779 A1 | 12/2014 |
| WO | 2017013510 A1 | 1/2017 |
| WO | 2018050487 A1 | 3/2018 |
| WO | 2020016102 A1 | 1/2020 |

OTHER PUBLICATIONS

European Search Report for EP Patent Application No. 19197734.7, Issued on Feb. 6, 2020, 3 pages.
International Search Report and Written Opinion for corresponding PCT/EP2020/075443 mailed Nov. 18, 2020; 10 pages.

* cited by examiner

*Primary Examiner* — K. Boyle
(74) *Attorney, Agent, or Firm* — Armstrong Teasdale LLP

(57) ABSTRACT

Described herein are polyamide foam particles including a polymer mixture including: (A) from 25 to 95 wt.-% of at least one polyamide, which is different from a copolyamide (B); and (B) from 5 to 75 wt.-% of at least one copolyamide prepared by polymerizing the following components: (B1) from 15 to 84 wt.-% of at least one lactam; and (B2) from 16 to 85 wt.-% of monomer mixture (M) including; (M1) at least one $C_{32}$-$C_{40}$ dimer acid; and (M2) at least one $C_4$-$C_{12}$ diamine; where the sum of the components (B1) and (B2) are 100 wt.-%. Also described herein is a process for preparing such polyamide foam particles and polyamide particle foam moldings obtainable by steam-chest molding.

12 Claims, No Drawings

HIGH CRYSTALLINITY POLYAMIDE FOAM PARTICLES AND FOAM MOLDINGS

CROSS-REFERENCE TO RELATED APPLICATIONS

This application is a U.S. National Phase Application of International Patent Application No. PCT/EP2020/075443, filed Sep. 11, 2020, which claims priority to European Patent Application No. 19197734.7, filed Sep. 17, 2019, the entire contents of which are hereby incorporated by reference herein.

The present invention relates to polyamide foam particles comprising a polymer mixture comprising
- (A) from 25 to 95 wt.-% of at least one polyamide, which is different from the copolyamide (B), and
- (B) from 5 to 75 wt.-% of at least one copolyamide prepared by polymerizing the following components
  - (B1) from 15 to 84 wt.-% of at least one lactam,
  - (B2) from 16 to 85 wt.-% of monomer mixture (M) comprising,
    - (M1) at least one $C_{32}$-$C_{40}$ dimer acid and
    - (M2) at least one $C_4$-$C_{12}$ diamine,
    where the sum of the components (B1) and (B2) are 100 wt.-%, a process for preparing such polyamide foam particles and polyamide particle foam moldings obtainable by steam-chest molding.

WO 2014/198779 relates to a method for producing expanded granulate from a thermoplastic elastomer having a breaking elongation of more than 100% by impregnating the polymer melt with $CO_2$ and/or $N_2$ and extruding the impregnated melt through a die plate into a underwater pelletizer to obtain expanded granulate grains having a closed skin.

WO 2017/013510 discloses a foamed material includes 50 to 90 weight percent of a semi crystalline resin and 10 to 50 weight percent of a poly(phenylene ether). The semi crystalline resin can be one or more of a polyamide, a polyester, and a polyolefin. The foamed material has a density of 40 to 700 kg/m³. It can be prepared by adding a blowing agent to a molten thermoplastic material containing the semi crystalline resin and the poly(phenylene ether), thereby forming a pre-foamed molten thermoplastic material, and extruding the pre-foamed molten thermoplastic material to form the foamed material. The foamed material is useful to form articles requiring solvent resistance.

WO 2011/134996 and US 2011/294910 relate to expandable granules, containing A) a polymer matrix consisting of A1) at least 55 wt % of polyamide (based on the sum of components A1) and A2)) having crystallinity of up to 30%, optionally a melting temperature in the range of 100 to 340° C., and a glass transition temperature in the range of 0 to 150° C., and A2) 0 to 45 wt % of one or more thermoplastic polymers different from component A1); B) a physical blowing agent component and optionally further additives, wherein said expandable granules are suitable for producing a particulate foam for use in the automotive industry, aviation industry, building industry, packaging industry, sports and recreation industry, in transportation and/or in construction.

The expandable granules must be expanded in a pre-foaming step in order to obtain low density foam particles.

EP 3 272 798 A1 discloses a polyamide resin foam-molded article characterized by containing polyamide resin and having a degree of crystallization X of 10-50% and a crystallite size D of 10 nm or greater when calculated based on the peak having the smallest peak width in the x-ray diffraction profile, and a method for producing the same. The base material resin containing the carbon dioxide gas was heated to cause foaming and thereby obtain pre-expanded particles having a density of 300 kg/m³.

PCT/EP2019/068716 relates to foam particles based on polyamides comprising 85 to 100% by weight of a long-chain polyamide and process for their preparation.

WO 2018/050487 relates to a polymer film comprising at least one copolyamide, the copolyamide being produced by polymerising at least one lactam and a monomer mixture comprising at least one $C_{32}$-$C_{40}$ dimer acid and $C_4$-$C_{12}$ diamine, a method for producing the polymer film and to the use of the polymer film as a packaging film.

U.S. Pat. No. 4,212,777 relates to linear, flexible high tensile strength copolyamides obtained from a dimeric fatty acid, hexamethylenediamine and caprolactam for molding, extrusion or spinning.

There is a need in the automotive industry for structural and semi-structural foams with a high temperature stability and enough mechanical stability, which can be used in light-weight structural components and pass an electrode-position coating process.

The object of the present invention is to provide foam particles for producing particle foam moldings with high temperature stability and a process for producing such foam particles and particle foam moldings, which particularly are suitable to pass high temperature conditions like an electrodeposition coating process. Especially the foam particles should have a high crystallinity and should be obtainable with low bulk densities by a continuous one-step process and should be convertible to particle foam moldings with high storage-modulus E' at high temperatures and high heat deflection temperature.

This problem was solved by polyamide foam particles comprising a polymer mixture comprising
- (A) from 25 to 95 wt.-% of at least one polyamide, which is different from the copolyamide (B), and
- (B) from 5 to 75 wt.-% of at least one copolyamide prepared by polymerizing the following components
  - (B1) from 15 to 84 wt.-% of at least one lactam,
  - (B2) from 16 to 85 wt.-% of monomer mixture (M) comprising,
    - (M1) at least one $C_{32}$-$C_{40}$ dimer acid and
    - (M2) at least one $C_4$-$C_{12}$ diamine,
    where the sum of the components (B1) and (B2) are 100 wt.-%

Preferably the polyamide foam particles have a bulk density is in the range from 100 to 500 kg/m³, most preferably in the range from 150 to 280 kg/m³.

The polymer mixture forms the matrix of the foam particles. Preferably the polyamide foam particles comprise from 80 to 100 wt.-% of the polymer mixture and 0 to 20 wt.-% of additives (C), more preferably from 85 to 99.9 wt.-% of the polymer mixture and 0.1 to 15 wt.-% of additives (C). Preferably the polymer mixture consists of components (A) and (B). More preferably the polyamide foam particles comprise a polymer mixture consisting of from 40 to 90 wt.-% of polyamide (A), from 10 to 60 wt.-% of copolyamide (B).

The polyamide foam particles may comprise further additives (C), such as nucleating agents, blowing agents, dyes, pigments, flame retardant, IR-absorber and/or inorganic fillers. The total amounts of all additives (C) are preferably in the range from 0 to 20 wt.-% in addition to 100% of the polymer mixture. The total amount of the additives (C) are more preferably in the range from 0.1 to 15 wt.-%, based on 100% of the polymer mixture, most preferably based on 100% of the sum of components (A) and (B). Preferably the polyamide particles comprise (C) from 0 to 5 wt.-%, more preferably from 0.1 to 1 wt. % in addition to the sum of the components (A) and (B) of a nucleating agent. Preferably the nucleating agent is talcum. The sum of the components (A) and (B) is preferably 100%, based on all polymeric components of the polyamide foam particles.

Preferably the polyamide foam particles comprise
(A) from 25 to 95 wt.-% of at least one polyamide, which is different from the copolyamide (B), and
(B) from 5 to 75 wt.-% of at least one copolyamide prepared by polymerizing the following components
(B1) from 15 to 84 wt.-% of at least one lactam,
(B2) from 16 to 85 wt.-% of monomer mixture (M) comprising,
(M1) at least one $C_{32}$-$C_{40}$ dimer acid and
(M2) at least one $C_4$-$C_{12}$ diamine,
where the sum of the components (B1) and (B2) are 100 wt.-%,
(C) from 0.1 to 1 wt.-% of a nucleating agent, based on the sum of (A) and (B).

Component (A)

Component (A) comprises at least one polyamide, which is different from the copolyamide (B). Preferably component (A) does not comprise a copolyamide prepared by a monomer mixture (M) comprising,
(M1) at least one $C_{32}$-$C_{40}$ dimer acid and
(M2) at least one $C_4$-$C_{12}$ diamine.

Preferably Component (A) comprises at least one polyamide selected from the group consisting of polycaprolactam (PA6), polybutylene adipamide (PA 4.6), polyhexamethylene adipamide (PA 6.6), polyhexamethylene sebacamide (PA 6.10), polyhexamethylene dodecanamide (PA 6.12), Poly-1 1-aminoundecanamide (PA 11), polylaurolactam (PA 12), poly-mxylylene adipamide (PAMXD 6), polypentamethylene sebacamide (PA 510), 6T/Z (Z=lactam), 6T/6I, 6T/6I/XY, 6T/XT (X=straight-chain or branched C4-C18-diamine), XT (X=C4-C18-diamine), 6.12. PA PACM 12 (PACM=p-diaminodicyclohexylmethane), PA MACM 12 (MACM=3,3-dimethyl-pdiaminodicyclohexylmethane), PA MPMD 6 (M PMD 2-methyl pentamethylene diamine), PA MPMD T, PA MPMD 12, polyhexamethylene isophthalamide (PA 6I), polyhexamethylene isophthalamide cohexamethylene terephthalamid (PA 6I/6T), PA 6-3-T (terephthalic acid polyamide and mixtures of 2,2,4- and 2,4,4-trimethylhexamethylenediamine), polybutylene sebacamide (PA 4.10), polydecamethylene sebacamide (PA 10.10), polypentamethylene adipamide (PA 5.6), PA 6/66 and PA 66/6, PA 6Y (Y=C4-C18-diacid) and their transamidation products.

Most preferably component (A) is selected from the group consisting of polycaprolatam (PA6), polyhexamethylene adipamide (PA 6.6) and polyhexamethylene sebacamide (PA 6.10), polyhexamethylene isophthalamide cohexamethylene terephthalamid (PA 6I/6T) or mixtures therefrom, especially mixtures from polycaprolactam (PA6) and (PA 6I/6T).

Also particularly preferred are polyamides (A) having a crystallinity of more than 20%, optionally a melting temperature Tm in the range of 100 to 340° C. (DIN EN ISO 11357-3: 2014) and a glass transition temperature in the range of 40 to 135° C. (DIN EN ISO 11357-2: 2014). The crystallinity is determined according to the invention by means of differential scanning calorimetry (DSC) DIN EN ISO 11357_3_2018 by integration of the melting signal, i. a crystallinity of 100% corresponds to 230 J/g (Journal of Polymer Science Part B Polymer Physics 35 (1997) 2219-2231).

Component (B)

According to the invention, the at least one copolyamide has been prepared by polymerizing 15% to 84% by weight of component (B1) and 16% to 85% by weight of component (B2); preferably, the copolyamide has been prepared by polymerizing 40% to 83% by weight of component (B1) and from 17% to 60% by weight of component (B2); especially preferably, the at least one copolyamide has been prepared by polymerizing from 60% to 80% by weight of component (B1) and 20% to 40% by weight of component (B2), where the sum of the components (B1 and (B2) are 100%.

The polymerization of components (B1) and (B2) may take place in the presence of a catalyst. Suitable catalysts are all catalysts that are known to those skilled in the art and catalyze the polymerization of components (B1) and (B2). Catalysts of this kind are known to those skilled in the art. Preferred catalysts are phosphorus compounds, for example sodium hypophosphite, phosphorous acid, triphenylphosphine or triphenyl phosphite.

The polymerization of components (B1) and (B2) forms the copolyamide, which therefore receives structural units derived from component (B1) and structural units derived from component (B2). Structural units derived from component (B2) comprise structural units derived from components (M1) and (M2).

Preferably the at least one copolyamide is a random copolymer.

The at least one copolyamide typically has a glass transition temperature (Tg) the range from 20 to 50° C., preferably in the range from 23 to 47° C. and especially preferably in the range from 25 to 45° C., determined according to DIN EN ISO 11357-2: 2014.

The at least one copolyamide typically has a melting temperature (Tm) in the range from 150 to 210° C., preferably in the range from 160 to 205° C. and especially preferably in the range from 160 to 200° C., determined according to DIN EN ISO 11357-3: 2014.

The at least one copolyamide generally has a viscosity number (VN) in the range from 150 to 300 mL/g, determined in a 0.5% by weight solution of the at least one copolyamide in a mixture of phenol/o-dichlorobenzene in a weight ratio of 1:1. Preferably, the viscosity number (VN) of the at least one copolyamide is in the range from 160 to 290 mL/g and more preferably in the range from 170 to 280 mL/g, determined in a 0.5% by weight solution of the at least one copolyamide in a mixture of phenol/o-dichlorobenzene in a weight ratio of 1:1.

Component (B1)

Component (B1) is at least one lactam. In the context of the present invention, lactams are understood to mean cyclic amides having, in the ring, preferably 4 to 12 and more preferably 5 to 8 carbon atoms.

Suitable lactams are selected, for example, from the group consisting of 3-aminopropanolactam (propio-3-lactam; β-lactam; β-propiolactam), 4-aminobutanolactam (butyro-4-lactam; γ-lactam; γ-butyrolactam), 5-aminopentanolactam (2-piperidinone; δ-lactam; δ-valerolactam), 6-aminohexanolactam (hexano-6-lactam: ε-lactam; ε-caprolactam), 7-aminoheptanolactam (heptano-7-lactam; ζ-lactam; ζ-heptanolactam), 8-aminooctanolactam (octano-8-lactam; η-lactam;

η-octanolactam), 9-aminononanolactam (nonano-9-lactam; θ-lactam; θ-nonanolactam), 10-aminodecanolactam (decano-10-lactam; ω-decanolactam), 11-aminoundecanolactam (un-decano-11-lactam; ω-undecanolactam) and 12-aminododecanolactam (dodecano-12-lactam; ω-dodecanolactam).

The lactams may be unsubstituted or at least monosubstituted. If at least monosubstituted lactams are used, these may bear, on the nitrogen atom and/or on the carbon atoms of the ring, one, two or more substituents independently selected from the group consisting of $C_1$- to $C_{10}$-alkyl, $C_5$- to $C_6$-cycloalkyl and $C_5$- to $C_{10}$-aryl.

Suitable $C_1$- to $C_{10}$-alkyl substituents are, for example, methyl, ethyl, propyl, isopropyl, n-butyl, sec-butyl and tert-butyl. An example of a suitable $C_5$- to $C_6$-cycloalkyl substituent is cyclohexyl. Preferred $C_5$- to $C_{10}$-aryl substituents are phenyl and anthranyl.

Preference is given to using unsubstituted lactams, preference being given to γ-lactam (γ-butyrolactam), δ-lactam (δ-valerolactam) and ε-lactam (ε-caprolactam). Particular preference is given to δ-lactam (δ-valerolactam) and ε-lactam (ε-caprolactam), especial preference to ε-caprolactam.

Monomer Mixture (M)

According to the invention, component (B2) is a monomer mixture (M). The monomer mixture (M) comprises components (M1), at least one $C_{32}$-$C_{40}$ dimer acid and (M2) at least one $C_4$-$C_{12}$ diamine.

The monomer mixture (M) comprises, for example, in the range from 45 to 55 mol % of component (M1) and in the range from 45 to 55 mol % of component (M2), preferably in the range from 47 to 53 mol % of component (M1) and in the range from 47 to 53 mol % of component (M2), more preferably in the range from 49 to 51 mol % of component (M1) and in the range from 49 to 51 mol % of component (M2), based in each case on the total molar amount of monomer mixture (M).

Component (B2) may also additionally comprise a component (M3), at least one $C_4$-$C_{20}$ diacid. Preferably Component (B2) consists of components (M1) and (M2).

Component (M1)

According to the invention, component (M1) is at least one $C_{32}$-$C_{40}$ dimer acid. In the context of the present invention, "at least one $C_{32}$-$C_{40}$ dimer acid" means either exactly one $C_{32}$-$C_{40}$ dimer acid or a mixture of two or more $C_{32}$-$C_{40}$ dimer acids. Suitable unsaturated fatty acids for preparation of the at least one $C_{32}$-$C_{40}$ dimer acid are known to those skilled in the art and are, for example, unsaturated $C_{16}$ fatty acids, unsaturated $C_{18}$ fatty acids and unsaturated $C_{20}$ fatty acids.

Component (M1) is especially preferably at least one $C_{36}$ dimer acid. The at least one $C_{36}$ dimer acid is preferably prepared proceeding from unsaturated $C_{18}$ fatty acids. More preferably, the $C_{36}$ dimer acid is prepared proceeding from $C_{18}$ fatty acids selected from the group consisting of petroselic acid ((6Z)-octadeca-6-enoic acid), oleic acid ((9Z)-octadeca-9-enoic acid), elaidic acid ((9E)-octadeca-9-enoic acid), vaccenic acid ((11E)-octadeca-11-enoic acid) and linoleic acid ((9Z,12Z)-octadeca-9,12-diensäure). In the preparation of component (M1) from unsaturated fatty acids, trimer acids may additionally form; residues of unreacted unsaturated fatty acid may also remain.

Preferably in accordance with the invention, component (M1) comprises not more than 0.5% by weight of unreacted unsaturated fatty acid and not more than 0.5% by weight of trimer acid, more preferably not more than 0.2% by weight of unreacted unsaturated fatty acid and not more than 0.2% by weight of trimer acid, based in each case on the total weight of component (M1).

The dimer acids to be used are obtainable as commercial products. Examples of these include Radiacid 0970, Radiacid 0971, Radiacid 0972, Radiacid 0975, Radiacid 0976 and Radiacid 0977 from Oleon, Pripol 1006, Pripol 1009, Pripol 1012, and Pripol 1013 from Croda, Empol 1008, Empol 1012, Empol 1061 and Empol 1062 from BASF SE, and Unidyme 10 and Unidyme TI from Arizona Chemical.

Component (M1) has an acid number, for example, in the range from 190 to 200 mg KOH/g.

Component (M2)

According to the invention, component (M2) is at least one $C_4$-$C_{12}$ diamine. In the context of the present invention, "at least one $C_4$-$C_{12}$ diamine" means either exactly one $C_4$-$C_{12}$ diamine or a mixture of two or more $C_4$-$C_{12}$ diamines.

Suitable components (M2) are selected, for example, from the group consisting of 1,4-diaminobutane (butane-1,4-diamine; tetramethylenediamine; putrescine), 1,5-diaminopentane (pentamethylenediamine; pentane-1,5-diamine; cadaverine), 1,6-diaminohexane (hexamethylenediamine; hexane-1,6-diamine), 1,7-diaminoheptane, 1,8-diaminoctane, 1,9-diaminononane, 1,10-diaminodecane (decamethylenediamine), 1,11-diaminoundecane (undecamethylenediamine) and 1,12-diaminododecane (dodecamethylenediamine).

Preferably, component (M2) is selected from the group consisting of tetramethylenediamine, pentamethylenediamine, hexamethylenediamine, decamethylenediamine and dodecamethylenediamine.

Component (M3)

According to the invention, any component (M3) present in component (B2) is at least one $C_4$-$C_{20}$ diacid. In the context of the present invention, "at least one $C_4$-$C_{20}$ diacid" means either exactly one $C_4$-$C_{20}$ diacid or a mixture of two or more $C_4$-$C_{20}$ diacids.

Suitable components (M3) are selected, for example, from the group consisting of butanedioic acid (succinic acid), pentanedioic acid (glutaric acid), hexanedioic acid (adipic acid), heptanedioic acid (pimelic acid), octanedioic acid (suberic acid), nonanedioic acid (azelaic acid), decanedioic acid (sebacic acid), undecanedioic acid, dodecanedioic acid, tridecanedioic acid, tetradecanedioic acid and hexadecanedioic acid.

Preferably, component (M3) is selected from the group consisting of pentanedioic acid (glutaric acid), hexanedioic acid (adipic acid), decanedioic acid (sebacic acid) and dodecanedioic acid.

Component (C)

In addition to the polymer mixture the polyamide foam particles may comprise further additives such as nucleating agents, residual blowing agents, dyes, pigments, flame retardant, IR-absorber and/or inorganic fillers. Most preferably talcum is used as component (C).

Subject of the invention is also a process for preparing polyamide foam particles as described above, comprising the steps of
- a) Providing a polymer mixture comprising
  - (A) from 25 to 95 wt.-% of at least one polyamide,
  - (B) from 5 to 75 wt.-% of at least one copolyamide prepared by polymerizing the following components
    - (B1) from 15 to 84 wt.-% of at least one lactam,
    - (B2) from 16 to 85 wt.-% of monomer mixture (M) comprising,
      - (M1) at least one $C_{32}$-$C_{40}$ dimer acid and
      - (M2) at least one $C_4$-$C_{12}$ diamine,
      - where the sum of the components (B1) and (B2) are 100 wt.-%
- b) melting the polymer mixture and adding 0 to 5 wt.-%, preferably 0.1 to 1 wt. %, based on 100% of the polymer mixture, of a nucleating agent before or after melting,
- c) impregnating the melted polymer mixture with 0.1 to 4.0 wt.-%, preferably 0.2 to 2.5 wt %, carbon dioxide, nitrogen or mixtures thereof, based on 100% of the polymer mixture, to form an impregnated polymer melt,
- d) extruding and granulating the impregnated polymer melt in an underwater pelletizer to form polyamide foam particles.

Preferably talcum is used as nucleating agent (component (C) in step b).

Preferred processes provide in step a) a polymer mixture comprising components (A) and (B) as described above for the polyamide foam particles.

The polymer melt comprising carbon dioxide, nitrogen or mixtures thereof as blowing agent and optionally nucleating agents and other auxiliary additives is preferably extruded through a perforated disk controlled to a temperature between 150° C. and 350° C. into a pelletizing chamber, using a cutting device to comminute the polymer melt pressed through the temperature-controlled perforated disk into individual expanding pellets and discharging the pellets from the pelletizing chamber using a liquid stream.

For the production of polyamide particle foam which comprise the polymer melt, blowing agent and optionally further auxiliary agents, such as IR-absorber (ie. Graphite, carbon black) or co-blowing agents liked ethanol, water or acetone, generally an extruder and/or a melt pump is used. These apparatuses are also used to generate the pressure required to press the polymer melt through the perforated disk. In the process, the melt is brought to the temperature required for the subsequent pelletization. The pressure required for the pelletization and the temperature required for the melt are dependent on the polymer, auxiliary agents, blowing agent and mixing ratio between the components. It is through the temperature-controlled perforated disk that the polymer melt passes into the pelletizing chamber. The pelletizing chamber is traversed by a stream of a temperature-controlled liquid, the pressure of which is from 0.1 bar to 20 bar, preferably from 0.5 to 15 bar above ambient pressure.

In the pelletizing chamber, the polymer forced through the temperature-controlled perforated disk is shaped into strands which a cutting device comminutes into individual expanding pellets. The cutting device may be embodied as a fast-rotating blade for example. The shape of the resulting pellets is dependent on the shape and size of the openings in the perforated disk and on the pressure at which the melt is forced through the holes in the perforated disk and on the speed of the cutting device. It is preferable for the forcing pressure, the speed of the cutting device and the size of the holes in the perforated disk to be chosen such that the shape of the pellets is substantially spherical or elliptical.

The pellets are discharged from the pelletizing chamber by the temperature-controlled liquid which flows through the pelletizing chamber. The choice of the pressure and the temperature for the temperature-controlled liquid is such that the polymer strands/pellets are expanded by the blowing agent they contain in controlled fashion and an uninterrupted skin is produced on the surface of the pellets. The temperature of the liquid in the pelletizing chamber is preferably between 5° C. and 90° C. in order that the pellets may undergo a controlled expansion in which an uninterrupted foamed skin is formed. The temperature of the liquid is preferably between 10° C. and 90° C. and more preferably between 50° C. and 80° C. In accordance with the invention, the temperature of the temperature-controlled perforated disk is preferably between 150° C. and 350° C., more preferably between 250° C. and 320° C.

The pellets flow together with the temperature-controlled liquid into a dryer where the pellets are separated from the liquid. The final expanded pellets are collected in a container, while the liquid is filtered and returned into the pelletizing chamber via a pump.

Lower bulk densities for the foam particles may be achieved by further expansion with pressurized air or steam, IR- or microwave radiation.

A further subject of the invention is a process for preparing polyamide particle foam moldings by steam-chest molding of polyamide foam particles according to a he invention at a temperature in the range from 100 to 150° C. as well as polyamide particle foam moldings, obtainable according to this process. Other welding technologies like Radio frequency and variotherm (Fox Velution), Artecama are suitable.

The polyamide particle foam moldings may be used for structural reinforcement of carrosserie parts.

The particle foam molding according to the invention show high heat deflection temperatures and have good and mechanical properties like good crash absorption in the temperature range of 120-200° C. Additional advantages for the particle foam molding is the isotropic behavior, symmetrical foam structure, complex 3D geometries possible and adjustable density profile.

The particle foam molding is preferably used for reinforcement of structural parts in the automotive, aerospace and consumer industry, such as carrosserie parts, blade inlays for wind energy constructions, equipment's for sport or leisure, transportation or packaging.

Examples

Raw Materials

| | |
|---|---|
| Ultramid ® B 40 | Polyamide 6, BASF SE, density 1120-1150 kg/m$^3$, viscosity number (VN) 240-260 ml/g, melting point 220° C. |
| Ultramid ® Flex F 38 | Copolyamide 6/6.36, BASF SE, density 1060-1090 kg/m3, relative Viscosity (RV) 3.7-3.9, melting point 199° C., |
| Selar ®PA3426 | Polyamide 6I/6T, DuPont, density 1.19 g/cm3, amorphous nylon (polyamide)resin, glass transition Temperature 125° C. |
| Talc | Talc microtalk IT extra, mondo mineral, average particle size d50% <2 μm) |
| Blowing agent | Carbon dioxide 4.6 (CO$_2$), Praxair, purity 99.999% Nitrogen 5.0 (N$_2$) Praxair, purity 99.999% |

Methods

The particle bulk density of the expandable or expanded granulates was determined in accordance with DIN ISO 697: 1982.

The part density is measured according to DIN EN ISO 845-10:2009

Glass transition temperature Tg was determined by DSC according to DIN EN ISO 11357-2: 2014 at a heating rate of 20 K/min Melting temperature Tm was determined by DSC according to DIN EN ISO 11357-3: 2014.

The relative crystallization degree was determined by differential scanning calorimetry (DSC) by integration of the melting signal, i. a crystallinity of 100% corresponds to 230 J/g (Journal of Polymer Science Part B Polymer Physics 35 (1997) 2219-2231). The measurement is carried out according to the invention according to DIN EN ISO 11357_3: 2018

Heat deflection temperature was measured according to DIN 53424:1978 in range of 20-230° C. with Gabo Eplexor 500 and a frequency of 1 Hz. Dryed samples (7d/80° C./Vakuum) were used.

Storage Modulus E' was determined by DMTA according to ISO 6721-1:2019) in range of −50 until 230° C. with Gabo Eplexor 500 and a frequency of 1 Hz. Dryed samples (7d/80° C./Vakuum) were used.

Example 1-11 and Comparative Examples C1-C4

The melt impregnation was carried out in an apparatus consisting of a twin-screw extruder, divided into eight zones of equal length (Z1 . . . Z8), of the company Leistritz with an 18 mm screw diameter and a length to diameter ratio of 40, a melt pump (MP), a start-up valve (SV), a melt filter, a perforated die plate (DP) and an underwater pelletizer (UWP).

Polyamides together with talc in a polyethylene bag were mixed and were feed in the twin screw extruder via a dosage unit. In the ⅓ of the extruder the polyamide was melted. After approximately ⅓ of the length of the extruder, the propellant was pumped with the aid of isco pump (piston pumps of the firm Axel Semrau) and was injected into the extruder. In the remaining part of the extruder the polymer melt was cooled by means of the temperature control of the twin-screw extruder. The temperature of the polymer melt, when passing through the perforated plate, corresponded to the temperature set at zone 8. By means of the melt pump (MP) the pressure profile in the extruder was set in such a way (pressure-speed control) that the blowing agent was completely mixed into the polymer melt. In addition to setting the pressure profile in the twinscrew extruder, the melt pump also serves to convey the blowing agent and pressed the polymer melt is through the following devices (the start-up valve, the melt screen and the perforated plate). The melt strand emerging through the perforated plate (1 hole with a diameter of 1 mm) was introduced into the underwater pelletizer (UWP) with pressure to give expanded polyamine granules with a granule weight of approx. 3.5 mg. The total throughput of the extruder was kept constant at about 4 kg/h. The strand in the water box was cut by 6 blades attached to the blade ring. The blade ring rotates at about 3500 upm, thereby producing expanded granulates with a granulate weight of 3.5 mg, which are transported by the water circuit from the perforated plate into the drier and are separated into a collecting container.

The weight fractions of the raw materials used and the properties of the expandable or expanded foam particles are compiled in table 1. The proportion of blowing agent added is based on 100% by weight polymer. The process parameters for each example are compiled in table 2. The temperatures are based on the temperature values set and measured at the respective apparatus parts.

Particle Foam Moldings

The pre-expanded particles were loaded into the cavity of a mold by injection with compressed air (cavity dimensions: 300 mm in length, 200 width and 25 mm in height). 12 mm crack filling is applied for highly compressed particles. The mold was installed in a molding machine. Thereafter, the pre-expanded particles were molded by supplying 128° C. saturated steam into the cavity for 8 seconds (cross steam heating), and subsequently supplying 128° C. saturated steam into the cavity for 10 seconds (Autoclave steam heating) via thermal fusion of the pre-expanded particles. Cooling water was supplied into the cavity of the mold for 20 seconds to cool the resultant shaped and welded product. Process conditions and properties of the particle foam moldings are compiled in table 3 and 4.

Comparative Example C3 and Example 2 demonstrate that by substitution of the amorphous Polyamide 6I/6T (Selar®PA3426) by Polyamide 6/6.36 (Ultramid® Flex 38) gives higher crystallization degree and higher Storage Modulus E' at temperatures above 160° C. (Table 4).

TABLE 1

Weight fraction of the raw materials and properties of expandable and expanded PA particles

| Example | C1 | C2 | C3 | C4 | 1 | 2 | 3 | 4 | 5 | 6 | 7 | 8 | 9 | 10 | 11 |
|---|---|---|---|---|---|---|---|---|---|---|---|---|---|---|---|
| Polyamide (A) | | | | | | | | | | | | | | | |
| Polyamide 6 | 40 | 40 | 40 | | 25 | 25 | 40 | 50 | 50 | 50 | 75 | 80 | 80 | 95 | 95 |
| Polyamide 6I/6T | 60 | 60 | 60 | | | | | | 20 | 20 | | 10 | 10 | | |
| Polyamide (B) | | | | | | | | | | | | | | | |
| Copolyyamide 6/6.36 | | | | 100 | 75 | 75 | 60 | 50 | 30 | 30 | 25 | 10 | 10 | 5 | 5 |
| Nucleating agent | | | | | | | | | | | | | | | |
| Talk | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 |

TABLE 1-continued

Weight fraction of the raw materials and properties of expandable and expanded PA particles

| Example | C1 | C2 | C3 | C4 | 1 | 2 | 3 | 4 | 5 | 6 | 7 | 8 | 9 | 10 | 11 |
|---|---|---|---|---|---|---|---|---|---|---|---|---|---|---|---|
| Blowing Agent | | | | | | | | | | | | | | | |
| Nitrogen (N2) | | 0.3 | 0.3 | 0.2 | 0.3 | 0.3 | 0.2 | 0.2 | 0.3 | 0.3 | 0.3 | 0.3 | 0.3 | 0.3 | 0.3 |
| Carbon dioxide (CO2) | | 2 | 0.3 | 0.3 | 2 | 0.7 | 1.3 | 1.5 | 0.4 | 2 | 0.7 | 0.8 | 2 | 0.8 | 2 |
| Water | 1.5 | | | | | | | | | | | | | | |
| Iso-pentane | 1 | | | | | | | | | | | | | | |
| Properties of foam particles | | | | | | | | | | | | | | | |
| Density expandable particle (g/L) | 630 | — | — | — | — | — | — | — | — | — | — | — | — | — | — |
| Density expanded particle (g/L) | 340 | 206 | 343 | 360 | 200 | 354 | 360 | 360 | 348 | 200 | 360 | 360 | 300 | 356 | 310 |
| Glass transition temperature (Tg) in ° C. | 95 | 95 | 97 | | | 45 | 50 | 52 | 70 | 70 | 47 | 67 | 67 | 43 | 43 |
| Relative crystallisation degree (%) | 15 | 12 | 12 | 19 | 22 | 22 | 23 | 22 | 22 | 22 | 23 | 23 | 23 | 25 | 25 |

TABLE 2

Process parameter for melt extrusion of PA

| | Temperature of extruder zones [° C.] | | | | | | | | Screw speed | Melt Pump (MP) | | Start up Valve (SV) | Die Plate (DP) | UWP | | | Speed cutting device |
|---|---|---|---|---|---|---|---|---|---|---|---|---|---|---|---|---|---|
| Ex | Z1 | Z2 | Z3 | Z4 | Z5 | Z6 | Z7 | Z8 | [Upm] | Temp [° C.] | Pressure [bar] | Temp [° C.] | Temp [° C.] | Temp [° C.] | Pressure [bar] | Throughput [g/h] | [Upm] |
| C1 | 240 | 240 | 240 | 240 | 240 | 240 | 240 | 240 | 155 | 240 | 95 | 240 | 280 | 42 | 13 | 3000 | 2500 |
| C2 | 251 | 270 | 270 | 250 | 250 | 230 | 230 | 230 | 170 | 260 | 95 | 270 | 310 | 76 | 13 | 4050 | 3555 |
| C3 | 251 | 270 | 270 | 250 | 250 | 230 | 230 | 230 | 170 | 260 | 95 | 270 | 310 | 68 | 13 | 4050 | 3555 |
| C4 | 270 | 270 | 270 | 270 | 270 | 270 | 260 | 260 | 190 | 260 | 95 | 250 | 300 | 60 | 13 | 4050 | 3560 |
| 1 | 280 | 280 | 280 | 280 | 280 | 280 | 280 | 280 | 220 | 260 | 95 | 270 | 310 | 70 | 13 | 2565 | 2150 |
| 2 | 280 | 280 | 280 | 280 | 280 | 280 | 280 | 280 | 200 | 260 | 95 | 270 | 310 | 68 | 13 | 4050 | 3560 |
| 3 | 280 | 280 | 280 | 280 | 280 | 280 | 280 | 280 | 200 | 260 | 95 | 270 | 310 | 76 | 13 | 4050 | 3555 |
| 4 | 280 | 280 | 280 | 280 | 280 | 280 | 280 | 280 | 200 | 260 | 95 | 270 | 310 | 80 | 13 | 4050 | 3300 |
| 5 | 270 | 270 | 270 | 250 | 250 | 230 | 230 | 230 | 185 | 260 | 95 | 270 | 310 | 55 | 13 | 4050 | 3500 |
| 6 | 280 | 280 | 280 | 280 | 280 | 280 | 280 | 280 | 180 | 260 | 95 | 270 | 310 | 76 | 13 | 4050 | 3500 |
| 7 | 280 | 280 | 280 | 280 | 280 | 280 | 280 | 280 | 200 | 260 | 95 | 270 | 310 | 80 | 13 | 4050 | 3300 |
| 8 | 280 | 280 | 280 | 280 | 280 | 280 | 280 | 280 | 200 | 260 | 95 | 270 | 310 | 76 | 13 | 4050 | 3500 |
| 9 | 280 | 280 | 280 | 280 | 280 | 280 | 280 | 280 | 200 | 260 | 95 | 270 | 310 | 76 | 13 | 4050 | 3500 |
| 10 | 310 | 310 | 310 | 300 | 300 | 280 | 280 | 280 | 222 | 260 | 95 | 270 | 310 | 76 | 13 | 4050 | 3566 |
| 11 | 310 | 310 | 310 | 300 | 300 | 280 | 280 | 280 | 222 | 260 | 95 | 270 | 310 | 76 | 13 | 4050 | 3566 |

TABLE 3

Process parameters for welding of foam particles

| Example | Particle bulk density [g/L] | Crack filling [mm] | Cross steam heating | | | Autoclave steam heating | | | Water cooling [s] | Part density after drying 70° C. for 16 h |
|---|---|---|---|---|---|---|---|---|---|---|
| | | | Time [s] | Pressure [bar] | Temperature ° C. | Time [s] | Pressure [bar] | Temperature [° C.] | | |
| C1 | 340.0 | 14.0 | 3 | 1.3 | 107 | 8 | 1.4 | 109 | 10 | 590 |
| C3 | 343.0 | 14.0 | 3 | 1.3 | 107 | 8 | 1.4 | 109 | 10 | 510 |
| C4 | 360.0 | 8 | 8 | 2.0 | 120 | 20 | 2.0 | 120 | 20 | 610 |
| 2 | 354.0 | 12 | 8 | 2.6 | 128 | 10 | 2.6 | 128 | 20 | 590 |
| 3 | 360.0 | 7.0 | 12 | 3.6 | 140 | 12 | 3.6 | 140 | 20 | 532 |
| 4 | 360.0 | 6.0 | 7 | 4.0 | 144 | 12 | 4.0 | 144 | 20 | 526 |
| 5 | 348.0 | 10.0 | 8 | 3.5 | 139 | 20 | 3.5 | 139 | 20 | 577 |
| 8 | 360.0 | 10.0 | 8 | 4.0 | 144 | 10 | 4.0 | 144 | 20 | 581 |
| 10 | 356.0 | 5.0 | 12 | 4.0 | 144 | 24 | 4.0 | 144 | 30 | 518 |

TABLE 4

Properties of particle foam moldings

| Example | C1 | C3 | C4 | 2 | 3 | 4 | 5 | 8 | 10 |
|---|---|---|---|---|---|---|---|---|---|
| Density molded Part (g/L) | 590 | 510 | 610 | 590 | 532 | 526 | 577 | 581 | 518 |
| Heat deflection temperature (° C.) | 215 | 215 | 180 | | | 220 | 223 | 225 | 230 |
| Storage Modulus E' at 23° C. (MPa) | 379 | 351 | 256 | 442 | 392 | 478 | 418 | 550 | 447 |
| Storage Modulus E' at 80° C. (MPa) | 295 | 322 | 64 | 114 | 145 | 173 | 250 | 316 | 193 |
| Storage Modulus E' at 160° C. (MPa) | 14 | 12 | 16 | 27 | 38 | 49 | 30 | 67 | 78 |
| Storage Modulus E' at 200° C. (MPa) | 5.2 | 5.2 | 1 | 5.4 | 8.5 | 14 | 7 | 35 | 40 |

The invention claimed is:

1. Polyamide foam particles comprising a polymer mixture comprising:
   (A) from 25 to 95 wt.-% of at least one polyamide, which is different from a copolyamide (B); and
   (B) from 5 to 75 wt.-% of at least one copolyamide prepared by polymerizing the following components:
      (B1) from 15 to 84 wt.-% of at least one lactam; and
      (B2) from 16 to 85 wt.-% of monomer mixture (M) comprising,
         (M1) at least one $C_{32}$-$C_{40}$ dimer acid; and
         (M2) at least one $C_4$-$C_{12}$ diamine;
      wherein the sum of the components (B1) and (B2) are 100 wt.-%.

2. The polyamide foam particles according to claim 1, wherein the monomer mixture (M) comprises in the range from 45 to 55 mol % of component (M1) and in the range from 45 to 55 mol % of component (M2), based in each case on the total molar amount of component (M).

3. The polyamide foam particles according to claim 1, wherein component (B1) is selected from the group consisting of 3-aminopropanolactam, 4-aminobutanolactam, 5-aminopentanolactam, 6-aminohexanolactam, 7-aminoheptanolactam, 8-aminooctanolactam, 9-aminononanolactam, 10-aminodecanolactam, 11-aminoundecanolactam, and 12-aminododecanolactam.

4. The polyamide foam particles according to claim 1, wherein component (M2) is selected from the group consisting of tetramethylenediamine, pentamethylenediamine, hexamethylenediamine, decamethylenediamine, and dodecamethylenediamine.

5. The polyamide foam particles according to claim 1, wherein the at least one copolyamide (B) has a melting temperature $T_m$ in the range from 150 to 210° C.

6. The polyamide foam particles according to claim 1, comprising a polymer mixture consisting of from 40 to 90 wt.-% of polyamide (A), from 10 to 60 wt.-% of copolyamide (B).

7. The polyamide foam particles according to claim 1, wherein the bulk density is in the range from 100 to 500 kg/m³.

8. A process for preparing polyamide foam particles, comprising the steps of:
   a) Providing a polymer mixture comprising:
      (A) from 25 to 95 wt.-% of at least one polyamide;
      (B) from 5 to 75 wt.-% of at least one copolyamide prepared by polymerizing the following components:
         (B1) from 15 to 84 wt.-% of at least one lactam; and
         (B2) from 16 to 85 wt.-% of monomer mixture (M) comprising;
            (M1) at least one $C_{32}$-$C_{40}$ dimer acid; and
            (M2) at least one $C_4$-$C_{12}$ diamine;
         wherein the sum of the components (B1) and (B2) are 100 wt.-%;
   b) melting the polymer mixture and adding 0 to 5 wt.-%, based on 100% of the polymer mixture, of a nucleating agent before or after melting;
   c) impregnating the melted polymer mixture with 0.1 to 4.0 wt.-% carbon dioxide, nitrogen or mixtures thereof, based on 100% of the polymer mixture, to form an impregnated polymer melt; and
   d) extruding and granulating the impregnated polymer melt in an underwater pelletizer to form polyamide foam particles.

9. The process according to claim 8, wherein 0.1 to 1 wt.-% of talcum is added as nucleating agent.

10. A process for preparing polyamide particle foam moldings by steam-chest molding of polyamide foam particles according to claim 1 at a temperature in the range from 100 to 150° C.

11. Polyamide particle foam moldings obtained according to the process of claim 10.

12. Use of A method of using the polyamide particle foam moldings according to claim 11, the method comprising using the polyamide particle foam moldings for reinforcement of structural parts in an automotive, aerospace, or consumer industry.

* * * * *